（12）United States Patent
Schaefer et al.

(10) Patent No.: US 10,893,746 B2
(45) Date of Patent: Jan. 19, 2021

(54) PERSONAL HYGIENE DEVICE

(71) Applicant: Braun GmbH, Kronberg (DE)

(72) Inventors: Norbert Schaefer, Frankfurt am Main (DE); Thomas Fritsch, Eppstein (DE); Andreas Kramp, Bad Camberg (DE); Andreas Larscheid, Kronberg (DE); Marc Kunz, Görgeshausen (DE); Robert Schäfer, Frankfurt (DE)

(73) Assignee: Braun GmbH, Kronberg (DE)

( * ) Notice: Subject to any disclaimer, the term of this patent is extended or adjusted under 35 U.S.C. 154(b) by 123 days.

(21) Appl. No.: 16/159,394

(22) Filed: Oct. 12, 2018

(65) Prior Publication Data

US 2019/0125068 A1  May 2, 2019

(30) Foreign Application Priority Data

Nov. 2, 2017  (EP) .................................. 17199721

(51) Int. Cl.
*A46B 15/00* (2006.01)
*A61C 17/22* (2006.01)
*A61C 17/16* (2006.01)
*A61C 17/34* (2006.01)

(52) U.S. Cl.
CPC .......... *A46B 15/0012* (2013.01); *A61C 17/16* (2013.01); *A61C 17/221* (2013.01); *A61C 17/34* (2013.01); *A46B 2200/1066* (2013.01)

(58) Field of Classification Search
CPC ....... A61C 17/221; A61C 17/16; A61C 17/22; A61C 17/34; A61C 17/3481; A61C 17/3409; A61C 17/3445; A46B 15/0012; A46B 15/0004
See application file for complete search history.

(56) References Cited

U.S. PATENT DOCUMENTS

| 450,599 A | 5/1984 | Scheller et al. |
| 10,502,291 B2* | 12/2019 | Fritsch .................. A61C 17/34 |
| 2015/0202030 A1 | 7/2015 | Miller |

(Continued)

FOREIGN PATENT DOCUMENTS

| JP | H07236519 | 9/1995 |
| WO | WO2014140959 A1 | 9/2014 |

(Continued)

*Primary Examiner* — Laura C Guidotti
(74) *Attorney, Agent, or Firm* — Vladimir Vitenberg

(57) ABSTRACT

A personal hygiene device has a handle and a treatment head pivotably connected with the handle. Applying a treatment force against the treatment head causes a pivoting of the treatment head relative to the handle. A sensor, such as, e.g., a Hall sensor, fixedly secured with respect to one of the handle and the treatment head, measures a measurement variable. A sensor cooperation unit defines or influences the measurement variable in dependence on the relative position of the sensor and the sensor cooperation unit, such e.g., as a sensor permanent magnet, fixedly secured relative to one of the handle and the treatment head. A spring unit defines a rest position of the treatment head when no treatment force is applied. The spring unit has a first spring constant in the treatment direction and a second spring constant in a lateral direction, the second spring constant being at least about two times higher than the first spring constant.

12 Claims, 8 Drawing Sheets

(56) References Cited

U.S. PATENT DOCUMENTS

2016/0015492 A1    1/2016   Skaanland et al.
2016/0331119 A1   11/2016   Schaefer et al.
2018/0087631 A1*   3/2018   Kramp ............... A61C 17/3472
2018/0125624 A1*   5/2018   Tweedie ............... A61C 17/221

FOREIGN PATENT DOCUMENTS

WO    WO2016055925 A1    4/2016
WO    WO2016174621 A1   11/2016
WO    WO2016181254 A1   11/2016

* cited by examiner (A-A)

US 10,893,746 B2

PERSONAL HYGIENE DEVICE

FIELD OF THE INVENTION

The present invention is concerned with a personal hygiene device comprising a handle and a treatment head, wherein the treatment head is pivotably connected with the handle so that applying a treatment force against the treatment head at least along a treatment direction leads to a pivoting of the treatment head relative to the handle around a pivot axis and a spring unit is arranged for defining a rest position of the treatment head when no treatment force is applied at the treatment head.

BACKGROUND OF THE INVENTION

It is known that a personal hygiene device can have a portion that pivots when a treatment force is applied at the treatment head of the personal hygiene device, where the pivotable portion is spring-connected by means of a spring unit with a fixed portion of the personal hygiene device. The spring unit provides for a defined zero position when no load is applied and provides a spring force that acts against the applied treatment force and brings the pivotable portion back into the zero position when no load is applied anymore.

It is an object of the present disclosure to provide a personal hygiene device of the discussed type having a spring unit particularly suitable for the task of spring-connecting a pivotable portion of the personal hygiene device to a fixed portion, in particular with respect to usage of construction volume.

SUMMARY OF THE INVENTION

In accordance with one aspect there is provided a personal hygiene device having a handle intended for being grasped by a user, a treatment head intended for being pressed against a body portion of a user, wherein the treatment head is pivotably connected with the handle so that applying a treatment force against the treatment head at least along a treatment direction leads to a pivoting of the treatment head relative to the handle around a pivot axis, a sensor for measuring a measurement variable, in particular a Hall sensor, fixedly secured with respect to one of the handle and the treatment head, a sensor cooperation unit for defining or influencing the measurement variable in dependence on the relative position of the sensor and the sensor cooperation unit, in particular a sensor permanent magnet, fixedly secured with respect to the other one of the handle and the treatment head, and a spring unit for defining a rest position of the treatment head when no treatment force is applied at the treatment head, where the spring unit has a first spring constant in the treatment direction and a second spring constant in a lateral direction that is perpendicular to the treatment direction, which second spring constant is at least about two times higher than the first spring constant.

In accordance with one aspect there is provided a personal hygiene device having a handle intended for being grasped by a user, a treatment head intended for being pressed against a body portion of a user, wherein the treatment head is pivotably connected with the handle so that applying a treatment force against the treatment head at least along a treatment direction leads to a pivoting of the treatment head relative to the handle around a pivot axis, a sensor for measuring a measurement variable, in particular a Hall sensor, fixedly secured with respect to one of the handle and the treatment head, a sensor cooperation unit for defining or influencing the measurement variable in dependence on the relative position of the sensor and the sensor cooperation unit, in particular a sensor permanent magnet, fixedly secured with respect to the other one of the handle and the treatment head, and wherein a spring unit defines a rest position of the treatment head when no treatment force is applied on the treatment head and the spring unit comprises at least a first rod-like spring element that extends along a longitudinal extension direction of the handle.

BRIEF DESCRIPTION OF THE DRAWINGS

The present disclosure is further elucidated by a detailed description and discussion of example embodiments, where reference is made to figures. In the figures

DETAILED DESCRIPTION OF THE INVENTION

Figure 1:
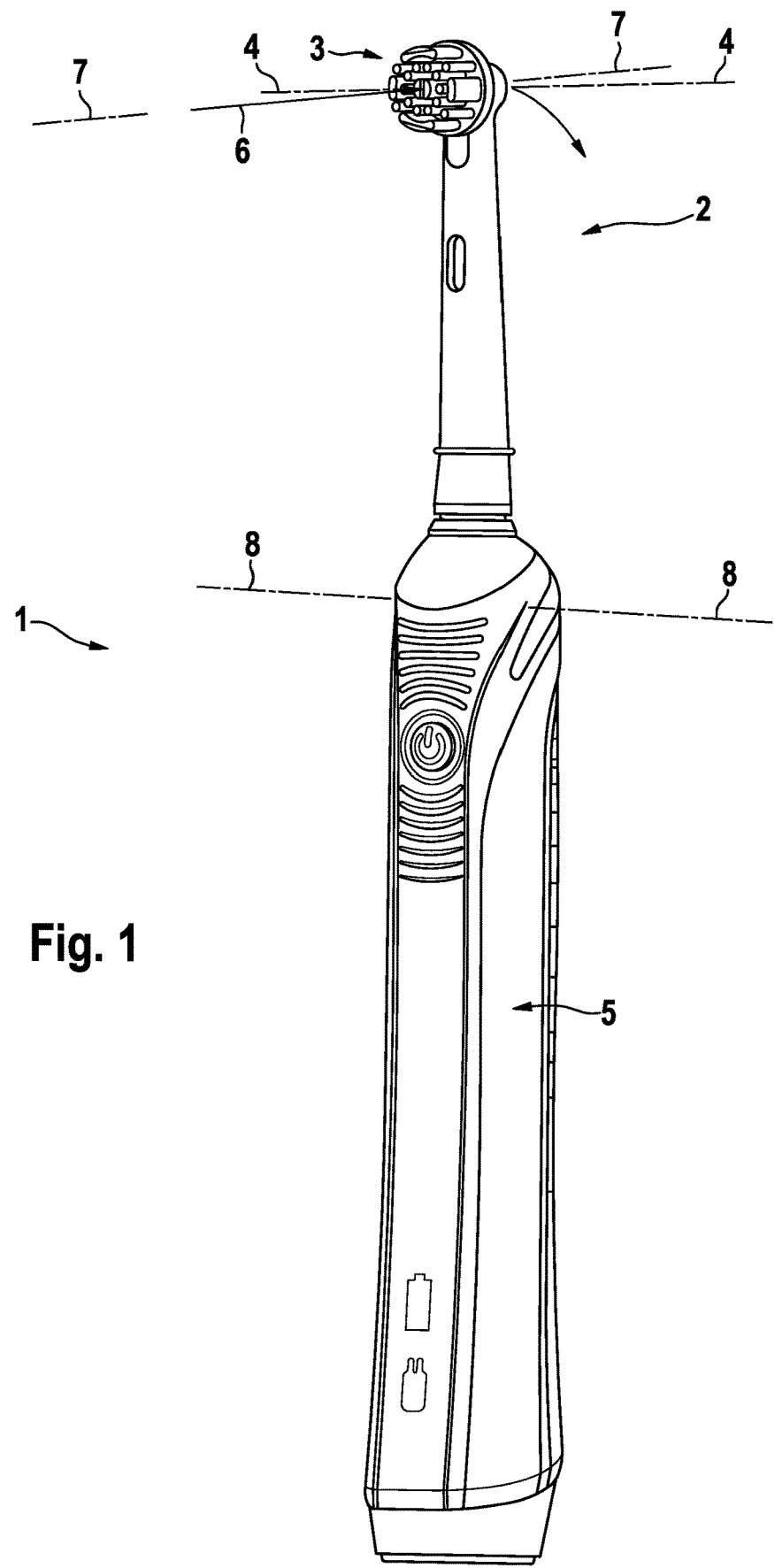
FIG. 1 is a depiction of an example personal hygiene device in accordance with the present disclosure.

In the context of the present description "personal hygiene" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("hygiene") and on the other hand the cosmetic treatment and improvement of the appearance of the skin and its adnexa. It shall include the maintenance and strengthening of wellbeing. This includes skin care, hair care, and oral care as well as nail care. This further includes other grooming activities such as beard care, shaving, and depilation. A "personal hygiene device" thus means any device for performing such nurturing or grooming activity, e.g. (cosmetic) skin treatment devices such as electric skin massage devices or electric skin brushes; electric shavers or trimmers; electric epilators; and electric oral care devices such electric toothbrushes, electric flossers, electric irrigators, electric tongue cleaners, or electric gum massagers. This shall not exclude that the proposed personal hygiene device may have a more pronounced benefit in one or several of these nurturing or device areas than in one or several other of these areas.

Where in the present disclosure the term "treatment force" or "external treatment force" is used, this means a force that is applied at the treatment head in a treatment direction, which treatment direction is perpendicular to the plane that is defined by the pivot axis of the motor carrier and the point at the brush head at which the treatment force is applied so that the applied treatment force provides a moment to pivot the motor carrier around the pivot axis. The total applied treatment force may be higher than the treatment force in the treatment direction, but as components of the treatment force acting in other directions are not measurable by the discussed setup, they are not considered. Typically, forces applied at the treatment head in a direction other than the treatment direction are absorbed in the bearings or by elastic deformation of the personal hygiene device.

In the following description, the sensor for measuring a measurement variable is described as a Hall sensor and the sensor cooperation unit for providing or influencing the measurement variable in dependence on the relative position between the sensor and the cooperation unit is described as a permanent magnet. But it shall be understood that this is just an example and other sensor/sensor cooperation unit pairs are considered as well. E.g. the sensor may be an inductance sensor measuring the inductance of a coil and the sensor cooperation unit may then be a coil core that influences the measured inductance depending on the position of the coil core. In another example, the sensor is a photodiode that measures the amount of light that it receives and the sensor cooperation unit is a shade that blocks a part of the light depending on its position relative to the photodiode. Many other examples are contemplated as well, e.g. the sensor may be a capacitance sensor and the sensor cooperation unit may be a dielectric object or the sensor may be an optical triangulation sensor and the sensor cooperation unit may be a reflective object. In the present context, the term "sensor" may mean a unit that includes a sensing component (e.g. photodiode) and a component that provides the measurable medium (e.g. LED or laser diode providing light) and the cooperation unit may then be an object that influences the measurement variable. In other embodiments, the sensor is arranged to measure the measurement variable (e.g. Hall sensor being capable to measure the magnetic flux at the sensitive area of the hall sensor) and the sensor cooperation unit is arranged to provide the measurement variable in a position dependent manner (e.g. permanent magnet providing a magnetic flux field).

In accordance with the present disclosure, the spring unit is arranged between the treatment head and the handle of the personal hygiene device. The treatment head may be fixedly connected with a support structure (e.g. a motor carrier) that extends in the hollow of the handle. Here it shall be understood that "fixedly connected" shall not exclude that the treatment head can be repeatedly attached to and removed from the support structure, but it shall mean that there is essentially no movement between the treatment head and the support structure. In the below description, it is focused on a support structure that is a motor carrier (i.e. a carrier that carries a motor), but it shall be understood that this is not limiting. The spring unit consists of at least one spring element or comprises at least one spring element. The spring unit may comprise further connection means such as screws.

Several requirements have to be considered when choosing the spring element of the spring unit:
  the spring element should have low manufacturing tolerances;
  the spring element should require a low construction volume;
  the spring constant should be in a range so that a certain travel distance between a no-load condition and a maximum applied external load is achieved.

Standard springs like coil springs do not fulfill these criteria at least with respect to the requirement of low manufacturing tolerances. A structured, planar leaf spring can be manufactured with relatively low tolerances and can also be designed and structured to provide needed spring constants. This is discussed further below with particular reference to FIGS. 10A and 10B. The present disclosure is focusing on a spring unit that comprises at least one spring rod.

In order to meet all requirements, an example spring system was chosen that has at least one rod-like spring element (in the following also named spring rod), in particular a spring rod having an essentially rectangular cross-sectional shape. In at least one embodiment, at least two spring rods are used. The spring rod (or spring rods) has cross-sectional dimensions generally around one millimeter, e.g. the cross-sectional dimensions may range from 0.6 mm to 2.0 mm, e.g. the height of the spring rod may be in the range of between 0.6 mm and 1.0 mm and the width of the spring rod may be in the range of between 1.0 mm to 2.0 mm, which means that the width to height ratio lies in a range of between 1 to 3.33, in particular between 1.25 and 2.0. In some embodiments, the width to height ratio is about 1.5. The width and height values then define a relatively sturdy spring that is so far not known from personal hygiene devices, in particular not from oral hygiene devices such as electric toothbrushes. Because of its sturdiness, a relatively long free length of the spring rod is to be used to fulfill the third requirement, namely the sensible travel length between the Hall sensor and the permanent magnet, which should be in the range of between 0.6 mm and 2.0 mm, in particular as a handle of a personal hygiene device does not provide much construction volume for large travel distances between the parts disposed inside of the handle. The free length of a single spring rod should be chosen to lie above 15 mm. In embodiments where two spring rods are used, the free length can be chosen to be above 20 mm. In some embodiments, two spring rods are chosen that extend parallel to each other and the spring rods may have a free length of 24.3 mm, a width of 1.2 mm, and a height of 0.8 mm. In order to achieve the same spring constant as with these two spring rods, a flat unstructured leaf spring having a thickness of 0.1 mm and a width of 20 mm could only have a free length of about 6.2 mm.

In some embodiments, a first spring constant of the spring unit in treatment direction is in the range of between 2 N/mm and 6 N/mm and a second spring constant in a lateral direction that is perpendicular to the treatment direction is in a range of between 6 N/mm and 24 N/mm.

A spring rod of the mentioned dimensions can be manufactured with relatively low tolerances. This allows precisely defining the rest position of the treatment head with respect to the handle in a floating manner with relatively high precision. The compact, sturdy cross sectional shape of the spring rod or spring rods allows mounting the spring rods without sacrificing much construction volume as the spring rods can e.g. be placed along the sides of other components, e.g. along a battery or accumulator disposed within the handle.

An end of a spring rod may be mounted in a receptacle providing a bearing so that the spring rod can pivot around a pivot point defined by the bearing. The bearing may also allow the spring rod to move in longitudinal direction to compensate for the length difference between the fixation points of the spring rod at the handle and at the treatment head or at a support structure fixedly connected with the treatment head. Instead of allowing the spring rod to move in longitudinal direction, the spring rod may be fixedly secured in a receptacle and the receptacle may be spring mounted at the treatment head or the support structure.

In some embodiments, a second pair of a Hall sensor and a permanent magnet are fixedly mounted with respect to the handle and the treatment head, respectively, where the second Hall sensor and the second permanent magnet are arranged in coaxial relationship in the rest position and they are arranged to move axially with respect to each other when an external force is applied at the brush head in the lateral direction. Such an arrangement allows to determine the applied lateral force value and thus allows also to correct for the effect in the Hall signal provided by the first Hall sensor due to the lateral displacement between the first permanent magnet and the first Hall sensor.

Several source of distortion of the Hall sensor signal are present in a personal hygiene device of the present type. E.g., the axial distance between the first permanent magnet and the first Hall sensor may be influenced by vibrations of the personal hygiene device in operations (e.g. caused by a drive unit). If the vibrations are caused by periodic excitation (e.g. by a constant frequency drive), the influence on the Hall sensor signal may be reduced when the Hall sensor signal is always measured at the same time instant within the cycle of the periodic vibration. Another source of distortion is the gravitational force, which acts on the treatment head that is pivotably mounted with respect to the handle. Depending on the orientation of the personal hygiene device with respect to earth's gravitational field, the axial distance between the first permanent magnet and the first Hall sensor is changed. In some embodiments, the personal hygiene device comprises an orientation sensor that can determine the orientation of the personal hygiene device with respect to earth's gravitational field, so that the influence of the orientation on the Hall sensor signal can be corrected for.

When a Hall sensor is used for the present purpose of measuring the motion of the treatment head or the support structure with respect to the handle, several challenges of the overall design have to be met:
1. The space in the handle of an electric toothbrush is limited, in particular in embodiments where the moving portion, namely the motor carrier, carries at least the complete motor, which typically is one of the most volume consuming parts of a personal hygiene device.
2. All parts of the personal hygiene device have an intrinsic manufacturing tolerance so that the final relative positions of the sensor permanent magnet and of the Hall sensor with respect to each other have a certain variation between individual personal hygiene devices.
3. The efficiency range of a Hall sensor should be used as good as possible.
4. Earth's gravity acting on the pivot mounted motor carrier will introduce changes in the Hall voltage depending on the orientation of the device relative to Earth's gravity field as the movable parts (e.g. the motor carrier) are then more or less influenced by this additional force and further vibrations of the device will add to the noise floor of the Hall voltage signal.
5. Costs for the sensor permanent magnet should be kept at an acceptable level.

In order to deal with the before mentioned challenges, various details of the design of the herein proposed arrangement were considered, where each of the below design aspects was considered alone (i.e. in itself) and also in combination with one or more or even all of the other aspects (which means, that each of the below features is a feature disclosed individually and also in all possible combinations with one or several features, as long as this is not leading to contradictory combinations):
1. The shape of the sensor permanent magnet may be chosen to be cylindrical or disc-like (where the latter just refers to a cylinder having a height that is lower than the diameter).
2. The area of the surface of the sensor permanent magnet that faces the Hall sensor may be chosen to be in a range of between about 3 mm$^2$ and 15 mm$^2$, in particular in a range of between 7 mm$^2$ and 13 mm$^2$.
3. The height of the sensor permanent magnet may be set to lie in a range of between 1 mm and 3 mm, in particular in a range of between 1.5 mm and 2.5 mm, and further in particular the height of the sensor permanent magnet may be in the range of 2.0±0.25 mm
4. The volume of the sensor permanent magnet may be set to lie in a range of between 10 mm$^3$ and 30 mm$^3$, in particular in a range of between 15 mm$^3$ and 25 mm$^3$.
5. The magnetic remanence of the sensor permanent magnet may be defined to be in the range of between 200 mT and 2000 mT, in particular in a range of between 300 mT and 1500 mT
6. The product of the magnetic remanence of the sensor permanent magnet and of the volume of the sensor permanent magnet may be defined to be in a range of between 3000 mT·mm$^3$ and 20000 mT·mm$^3$, in particular in a range of between 12000 mT·mm$^3$ and 18000 mT·mm$^3$.
7. The specified positions of the sensor permanent magnet and the Hall sensor may be defined so that the cylinder axis of the sensor permanent axis centrally and perpendicularly crosses the effective area of the Hall sensor. It may in particular be defined that the relative motion of the sensor permanent magnet and of the Hall sensor then occurs essentially along the cylinder axis.
8. The travel distance between the permanent magnet and the Hall sensor may be defined to be above 0.5 mm, in particular of at least 0.8 mm, and further in particular to be around 1 mm
9. The initial distance between the sensor permanent magnet and the Hall sensor when the motor carrier is in a rest position (i.e. when no load acts on the treatment head, which position may then also be called the no-load position) may be defined to be in a range of between 2 mm and 6 mm, in particular to be in a range of between 3.5 mm and 5.5 mm, and further in particular the initial distance was set to be 4.5±0.25 mm
10. The magnetic field strength of the sensor permanent magnet, the initial distance between the Hall sensor and the sensor permanent magnet, and the travel distance may be set such that the system operates in the tail of the magnetic field where the behavior of the magnetic field strength is approximately linear as this utilizes the linear response range of the Hall sensor in a sensible manner.

11. It may be defined that the Hall sensor has a linear response range that lies in a range of between 10 mT to 200 mT, in particular of between 30 mT to 90 mT, i.e. the Hall sensor may have a linear response range of 40 mT or of 80 mT.
12. A first or minimum detectable threshold force value may be set to be in a range of between 0.5 N and 1.5 N and the travelled distance of the Hall sensor relative to the sensor permanent magnet between a no-load condition and the first detectable threshold force may be set to be at least 0.15 mm
13. A maximum detectable force value may be set to be in a range of between 2.0 N and 4.0 N, in particular in a range of between 2.5 N and 3.5 N (i.e. the design may be chosen such that, e.g., the Hall sensor linear sensitivity range ends when the maximum detectable force value is reached or, alternatively or additionally, at least one stopper element may be provided against which the motor carrier abuts when the maximum detectable force value is reached so that a further pivoting is mechanically inhibited).

The sensitive area of a Hall sensor is typically relatively small, e.g. the sensitive area may be around 1 mm$^2$ or lower, e.g. the sensitive area of a Hall sensor may be quadratic with an edge length of 0.2 mm, hence the active area is then 0.04 mm$^2$. In order to provide a magnetic flux density of relevant strength at a sensible distance between Hall sensor and sensor permanent magnet, the area of the sensor permanent magnet facing the Hall sensor was chosen to be in the range of between 3 mm$^2$ and 15 mm$^2$, in particular in the range of between 7 mm$^2$ and 13 mm$^2$. Then the sensitive area of the Hall sensor (often approximated as being a circular area) can approximately be considered as point-like against the area of the sensor permanent magnet. Under such conditions, it then is considered as practical to use a cylindrical sensor permanent magnet (an end face of the cylinder facing the Hall sensor has then a circular shape) and to position the sensor permanent magnet so that it is coaxial with the sensitive area of the Hall sensor (or such that the point-like sensitive area of the Hall sensor lies on the cylinder axis of the cylindrical sensor permanent magnet). This shall of course not exclude that other shapes of sensor permanent magnets can be used as well, e.g. the end face of the sensor permanent magnet may have a quadratic shape, any other geometric shape, or even an irregular shape. The magnetic flux density of the sensor permanent magnet at the Hall sensor can only to a lesser extent be increased by the thickness of the sensor permanent magnet. Hence, the thickness may be in the range of between 1 mm and 3 mm and in particular in the range of between 1.5 mm and 2.5 mm, further in particular the thickness may be in the range of 2±0.25 mm.

In some investigated embodiments, the sensor permanent magnet was made from NdFeBr and had a remanence of 1350 mT, the shape was cylindrical with a diameter of 3.8 mm and a cylinder height of 2 mm. The sensor permanent magnet was positioned at a distance of 4.4 mm to the Hall sensor and the travel distance towards the Hall sensor between a no-load condition and the maximally detectable external treatment force was 1 mm. In other embodiments, the travel distance is even higher, e.g. 1.1 mm, 1.2 mm, 1.3 mm, 1.4 mm, or 1.5 mm.

For some personal hygiene devices, in particular for toothbrushes, the external treatment force is the force with which the user pushes the brush head against the teeth. It is generally known that in order to be effective, a minimal force (i.e. a first threshold force value) shall be applied, and in order to protect in particular the gums from irritations, a maximum force (i.e. a second threshold force value) shall not be exceeded. Thus, it is an aim to be able to detect whether a user is in this range between the first threshold force value and the second threshold force value and to communicate the applied force to the user. The minimal and maximum force may depend to some extent on the type of treatment head that is used and may also depend on user preferences. The minimal force (first threshold force value) may lie in a range of between 0.5 N to 1.5 N and in particular in a range of between 0.5 N and 1.0 N. The maximum force (second threshold force value) may lie in a range of between 1.5 N and 3.5 N, in particular in a range of between 2.0 N and 3.0 N. The system may be arranged to be able to detect a maximum external treatment force in the range of 2.0 N and 4.0 N, in particular in the range of between 2.5 N and 3.5 N. In an investigated embodiment, the minimal force was set to 0.75 N, the maximum force was set to 2.15 N and the maximum detectable force was set to 3.0 N. At a travel distance of the sensor permanent magnet between the no-load state and the application of the maximum detectable force of 1.0 mm, the travel distance between no-load condition and application of the minimum force is 0.25 mm. In this context, various manufacturing tolerances have to be considered. Hence, when the travel distance is designed to be 1.0 mm, the overall tolerance in the manufacturing process ranging from the size of the magnet to the positions of the Hall sensor and the sensor permanent magnet easily sum up to about 0.1 mm. The travel distance should not be chosen to be below 0.5 mm as then the minimum force may not be reliably detected due to the mentioned tolerances. A travel distance of above 1.0 mm is certainly considered, where construction volume etc. allows this, e.g. a travel distance of 1.3 m may be chosen.

The Hall sensor may in particular be coupled to a controller that receives a signal from the Hall sensor that is indicative of the Hall voltage and thus is indicative of the treatment force applied at the treatment head. The controller may in particular be arranged to trigger an action of the personal hygiene device in dependence on the received signal from the Hall sensor and on at least one threshold force value. An action of the personal hygiene device may be a stop of the motor or a ramp-down of the motor amplitude when the signal from the Hall sensor indicates that the applied treatment force is higher than a second threshold force value indicating a too high force being applied.

The personal hygiene device may further comprise an indication unit coupled to the controller and the controller may then be arranged to indicate to a user whether the applied treatment force is below a first threshold force value or equal to or above a first threshold force value or additionally whether the applied treatment force is between a first and a second threshold force value by a visually detectable, an audibly detectable, and/or a tangibly detectable signal. E.g. the indication unit and the controller may be arranged to communicate to the user that the applied treatment force is below a first threshold force value by a neutral color such as e.g. a white light signal, that the applied treatment force is between a first threshold force value and a second threshold force value (i.e. that the applied treatment force is in the intended range) by a green light signal, and that the applied treatment force is above the second threshold force value by a red light signal. Instead of an abrupt change of the indicated color, the color of the light signal may be gradually changed. An RGB-LED allows such a gradual change of the indicated light signal.

The personal hygiene device may comprise a user interface allowing a user to influence a parameter of the personal hygiene device, in particular to set a first and/or second threshold force value.

The personal hygiene device may be arranged to detect the type of attachment or treatment head that is used with the personal treatment device. E.g. an attachment may comprise an RFID chip and the handle may comprise an RFID reader unit so that the type of the treatment head can be determined. The controller may then be arranged to automatically set at least a first threshold force value based on the detected/determined treatment head. The at least first threshold force value may be stored in a memory unit.

The personal hygiene device may be arranged to have a calibration mode in which the controller uses the signal from the Hall sensor at zero applied external treatment force and at least one further Hall signal at a predefined force acting at the treatment head to determine and thus calibrate a relation between the signal from the Hall sensor and the value of the treatment force applied at the treatment head. The calibration may in particular be used by the manufacturer in a controlled environment, where in a controlled manner the predefined treatment force can be applied at the treatment head. The calibration mode may be used in the assembly process just before packing the personal hygiene device into a sales package.

Further, the controller may be arranged to automatically reset the Hall sensor signal value for the no-load condition, in particular the controller may be arranged ti detect whether the personal hygiene device is in a charger stand (e.g. using an RFID identification as already described) or is in an upright position without being moved (e.g. by use of an accelerometer) to perform an automatic reset of the Hall signal value for the no-load condition under at least one of these conditions.

FIG. 1 is a depiction of an example embodiment of a personal hygiene device 1 that is realized as an electric toothbrush. The personal hygiene device 1 comprises an in particular detachable attachment 2 having a treatment head 3, even though a treatment head may also be provided at a non-detachable structure of the personal hygiene device 1. The treatment head 3 is here realized as a brush head and is mounted for driven oscillatory rotation around axis 4 as is generally known in the art. The attachment 2 is attached to a handle 5 of the personal hygiene device 1.

The handle 5 may in particular house a motor for driving the treatment had 3 into motion. A treatment force 6 acting on the treatment head in a direction 7 leads to a pivoting of the attachment 2 around a pivot axis 8 if the treatment force 6 has a force component that is perpendicular to the plane that is defined by the pivot axis 8 and the point at which the treatment force act on the treatment head 3 (the respective direction is herein named the "treatment direction"—the direction 7 indicated in FIG. 1 is not aligned with the treatment direction and thus the measured applied treatment force is lower than the total treatment acting at the treatment head). The treatment force 6 may in particular be formed by pushing the treatment head 3 against a treatment area of the user (e.g. in the shown embodiment, the brush head may be pushed against the teeth with a certain force so that the bristles mounted on the brush head can effectively clean the teeth). The attachment 2 is fixedly attached to a connector portion of the handle 5, which connector portion in turn is fixedly connected with a motor carrier disposed in the handle 5. The motor carrier is mounted for pivoting around the pivot axis 8 against a spring force.

Figure 2:
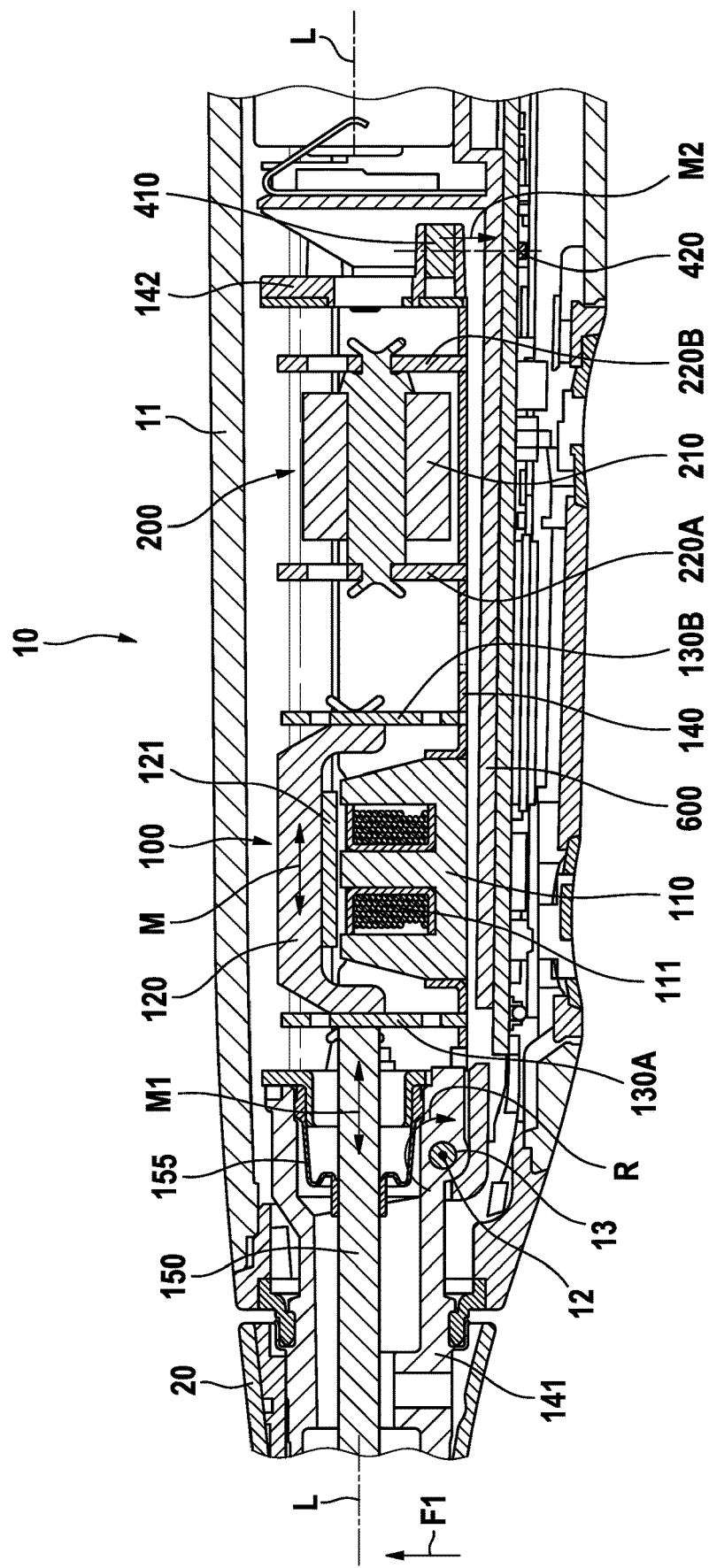
FIG. 2 is a cross-sectional cut through a section of personal hygiene device in accordance with the present disclosure.

FIG. 2 is a depiction of an example personal hygiene device 10 cut open along a longitudinal center plane, which personal hygiene device 10 is only partially shown (the front end and the bottom end of the personal hygiene device are not shown). The personal hygiene device comprises a handle 11 and a detachable attachment 20. A support structure realized as a motor carrier 140 is disposed in the handle 11 and is pivot mounted on an axle 13 to allow pivoting of the motor carrier 140 around a pivot axis 12. As was mentioned before, it is generally contemplated that the treatment head is directly spring-mounted at the handle or the treatment head is fixedly connected with a support structure, which is here realized as a motor carrier 140 that carries the motor.

The motor carrier 140 carries a spring-mass type resonant motor 100 and a vibration cancellation unit 200. The motor 100 comprises a stator portion 110 having a coil 111 wound around stator legs (here, the stator 110 has an E-core with three stator legs made from a soft magnetic material and the coil is wound around the center leg). In operation, a controller applies a periodic alternating motor drive signal having a first frequency at the coil 111. The periodic alternating drive signal leads to a periodic alternating current flow through the coil 111 and thus leads to the generation of a periodic alternating electromagnetic field. The motor 100 further comprises an armature portion 120 that has a motor permanent magnet 121 mounted at the armature portion 120 (while here the term "magnet" is used in its singular form, this shall not exclude that more than one motor permanent magnet is present). The armature portion 120 is spring-mounted at the motor carrier 140 by means of springs 130A and 130B. When the coil 111 generates a periodic alternating electromagnetic field in operation, the permanent magnet 121 interacts with the electromagnetic field and the resulting force drives the armature portion 120 into a linearly oscillating motion M along a longitudinal direction L out of the rest position of the armature portion 120 against the spring force provided by the springs 130A and 130B.

The vibration cancellation unit 200 comprises a mass 210 and springs 220A and 220B that mount the mass 210 at the motor carrier 140. The vibration cancellation unit 200 has a resonance frequency that coincides with the first frequency of the motor drive signal. In operation, when the motor is driven to oscillate at the first frequency, the vibrations that are transmitted to the motor carrier 140 serve as a periodic external excitation force. As the vibration cancellation unit 200 is excited essentially exactly at its resonance frequency and will as a consequence oscillate with opposite phase to the armature portion 120, it can efficiently cancel the vibrations transmitted to the motor carrier 140. As the actual resonance frequency of the vibration cancellation unit 200 is subject to manufacturing tolerances, it may be sensible to first measure the resonance frequency of the vibration cancellation unit 200 and then to set the first frequency of the motor drive signal to the determined resonance frequency of the vibration cancellation unit 200. While it is here shown that the vibration cancellation unit is mounted to the motor carrier 140, it may as well be mounted at the handle 11 as the vibrations generated by the motor 100 will be transmitted from the motor carrier 140 via the axle 13 to the handle 11.

At the distal end of the motor carrier 140 a holder element 142 is fixedly secured at the motor carrier 140, which holder element 142 holds a sensor permanent magnet 410 that is positioned in proximity to a Hall sensor 420. The Hall sensor 420 may in particular be mounted on a PCB, which PCB is fixedly mounted with respect to the handle 11. In principle, the Hall sensor 420 can also be fixedly mounted with respect to the motor carrier 140, but then electrical connections need to be provided that can withstand the repeated movement between the handle (at which the energy source is mounted) and the motor carrier 140.

When an external treatment force F1 acts on the treatment head (indicated by arrow F1), then this force F1 causes that the motor carrier 140 and all fixedly connected parts pivot around pivot axis 12 defined by axle 13 (as is indicated by arrow R), which axle 13 is mounted at the handle 11 and extends through the motor carrier 140. The external treatment force F1 thereby must act against a spring force that here is provided by a spring element (see FIGS. 6, 7, and 8) that is disposed between the motor carrier 140 and the handle 11. The spring element may in particular be mounted so that the motor carrier 140 is in an unbiased condition when it is in its rest position, i.e. any external treatment force F1 directly leads to a pivoting motion of the motor carrier 140. In embodiments where the spring element applies a biasing force, the motor carrier will only then start to pivot once the external treatment force overcomes the biasing force. In some embodiments, a first threshold force value should be detectable that is comparatively small, so that an unbiased motor carrier that directly pivots at least provides the maximum travel distance between zero external force (unloaded condition) and the first detectable threshold force.

Figure 3:
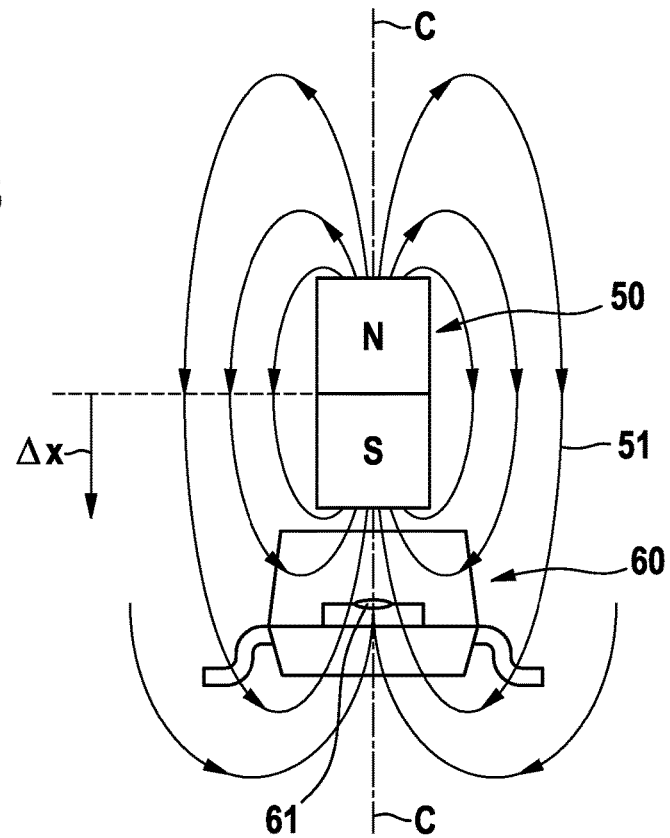
FIG. 3 is a schematic depiction of the relationship between a sensor permanent magnet and a Hall sensor that are coaxially aligned.

FIG. 3 is a schematic depiction of a sensor permanent magnet 50 that is here depicted as being a dipole that generates a magnetic field that is indicated by magnetic flux lines 51, and a Hall sensor 60, which is here shown as an SMD device suitable for automated mounting on a PCB. The Hall sensor 60 has a sensitive area 61 that typically is relatively small, in particular about 1 mm2 or lower, e.g. 0.5 mm2 or 0.25 mm2 or 0.1 mm2 or 0.01 mm2 Other magnetizations than a dipole magnetization are possible as well such as a quadrupole magnetization. When the sensor permanent magnet 50 is moved relative to the Hall sensor 60, the magnetic flux density at the sensitive area of the Hall sensor 60 changes and a respectively Hall voltage is provided by the Hall sensor. The Hall sensor may in particular be connected with a controller for receiving and in particular analyzing the Hall voltage. While any relative displacement between the sensor permanent magnet 50 and the Hall sensor 60 will lead to a change of the magnetic flux density at the sensitive area 61 of the Hall sensor 60 and thus to a change of the Hall voltage, it is here shown that the sensor permanent magnet 50 may move towards the Hall sensor 60, e.g. by a travel distance of Δx if a certain treatment force is applied. In particular, the sensor permanent magnet 50 and the Hall sensor 60 are coaxially arranged with respect to a center axis C and the relative motion between the sensor permanent magnet 50 and the Hall sensor occurs essentially along the center axis C (due to the pivoting of the motor carrier in the example discussed with respect to FIG. 2, a slightly curved movement will occur, which can be considered as a linear motion for the present purposes).

The sensor permanent magnet discussed in the present disclosure may be made from various materials suitable for making a permanent magnet. E.g. the sensor permanent magnet may be made from an alloy such as NdFeB or SmCo, which materials may be plastic bound or may be sintered. Sintered NdFeB magnets can have a remanence in the range of between 1 to 1.4 T. Hard ferrite materials such as strontium ferrite are generally also possible, even though the remanence of these materials typically is below about 400 mT. The remanence of plastic bound permanent magnets often is in the range of between 600 mT to 700 mT.

Figure 4:
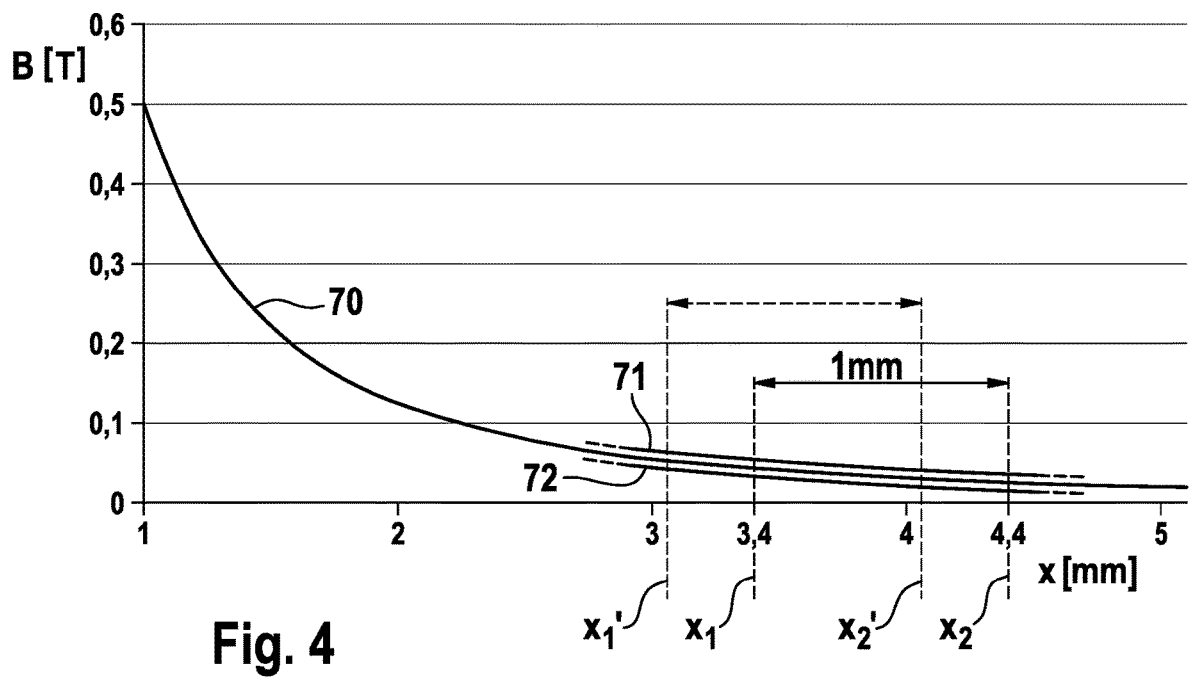
FIG. 4 is a depiction of the magnetic flux density B of a sensor permanent magnet in dependence on the distance x.

FIG. 4 is a graph showing as curve 70 the magnetic flux density B (in T) of an example sensor permanent magnet in dependence on the distance x (in mm) between the Hall sensor and the sensor permanent magnet. Just exemplary, two further curves 71 and 72 are partly shown, which curves 71 and 72 shall indicate the dependence of the magnetic flux density on various tolerances. In some embodiments, the initial distance between the sensor permanent magnet and the Hall sensor is set to X2=4.4 mm and the travel distance between a no-load condition and the maximally detectable treatment force shall be 1 mm (towards the Hall sensor) so that the end position is at x1=3.4 mm. The change of the magnetic flux density between these two positions provides the typical range in which the Hall sensor should provide a linear Hall voltage signal. The change in the magnetic flux density may, e.g., be about 40 mT. Due to position tolerances and/or size tolerances (a sintered NdFeB permanent magnet may easily have a size tolerance in the range of ±0.05 mm to ±0.1 mm), the initial distance and travel distance may also easily shift as is indicated by the dashed lines relating to shifted positions x1' and x2'. In order to cope with these tolerances, a Hall sensor must be chosen that has a larger linear range, e.g. about 80 mT, and the mention exemplary 40 mT detection range of the defined ideal positions and sizes etc. is then planned to lie centrally in the linear 80 mT sensitivity range of the chosen Hall sensor. It is noted that the above is just an example to show the general principles. Depending on the sensor permanent magnet size, material, initial distance to the Hall sensor etc., other Hall sensors may be used that e.g. have a linear sensitivity range of 20 mT or of 160 mT etc. Suitable Hall sensors include sensors from, e.g., the Allegro A1304 series (available from Allegro MicroSystems, LLC, Massachusetts, USA) or from the Diodes AH49F series (available from Diodes Incorporated, Texas, USA). The sensitivity of the Hall sensor may be in the range of between 10 mV/mT to 90 mV/mT.

Figure 5:
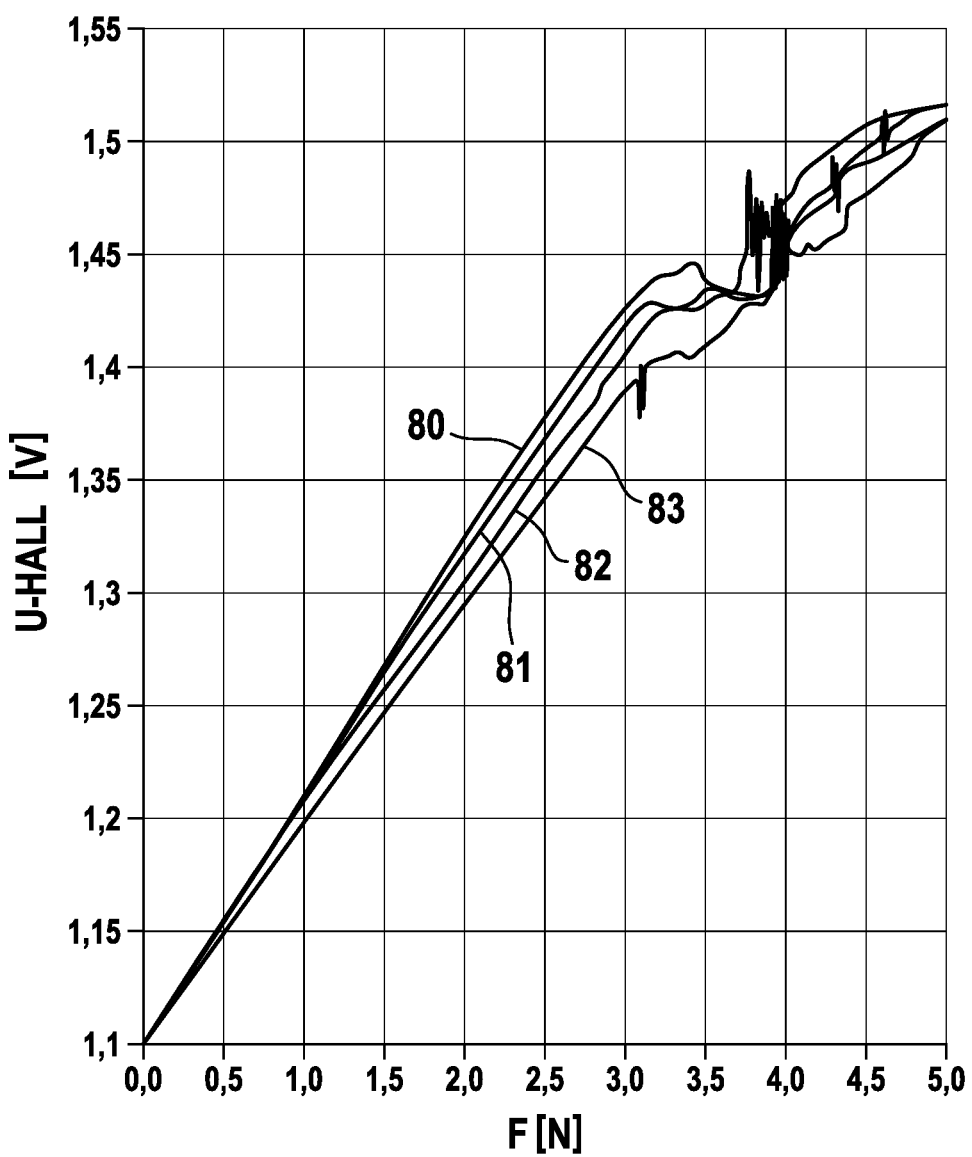
FIG. 5 is a graph showing measurements of the Hall voltage U-HALL in dependence on the applied external force F for four different samples of personal hygiene devices.

FIG. 5 is a graph that shows measurement curves 80, 81, 82, and 83 done with several investigated prototypes, where the Hall voltage signal U-HALL (in V) is shown as a function of the applied treatment force F (in N). The measurement curves 80 to 83 are essentially linear between a treatment force of 0 N and a treatment force of 3 N E g a minimum detectable treatment force or first threshold force value of 0.8 N is as well measurable as a second threshold force value of 2.5 N. Due to the differences of the curves, it is sensible to perform a calibration of the response of the system. A linear calibration may be sufficient, e.g. measuring the Hall voltage in a no-load condition and at a predefined treatment force (e.g. 2.0 N), even though this shall not exclude that the calibration works with more than two measurement points. A calibration may in particular be done at the manufacturing site prior to selling the personal hygiene device, so that the calibration parameter(s) can be stored in a memory of the personal hygiene device.

Figure 6:
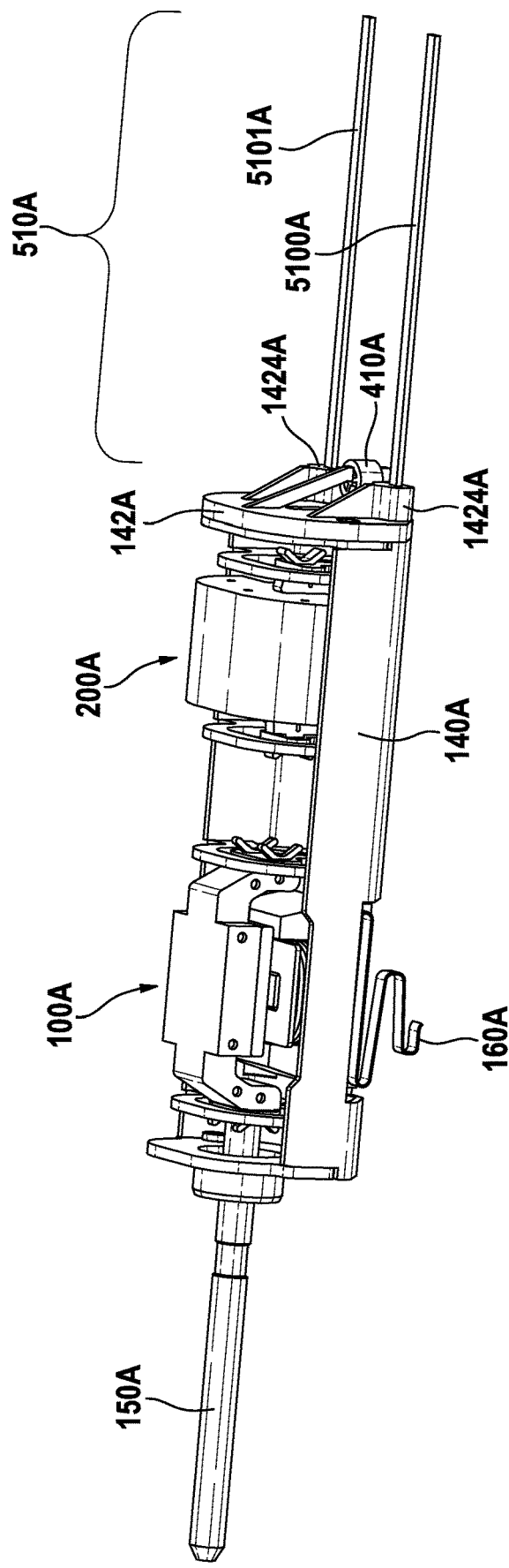
FIG. 6 is an isolated depiction of a motor carrier and of a spring unit comprising two rod-like spring elements.

FIG. 6 is a depiction of a motor carrier 140A that carries a motor 100A and a vibration cancellation unit 200A. A drive shaft 150A is connected with an armature portion of the motor 100A. An S-shaped electrical connector 160A can be used to electrically connect the motor 100A with an energy source, which S-type connector is flexible enough to accommodate the small movement of the motor carrier 140A under an applied treatment force relative to a handle of the personal hygiene device. A holder element 142A is fixedly secured at the motor carrier 140A and holds a sensor permanent magnet 410A and further two rod-like spring elements 5100A and 5101A. The rod-like spring elements 5100A and 5101A are on one end received in receptacles 1424A that are connected with the motor carrier 140A and will be received in respective holding fixtures that are fixed relative to the handle of the personal hygiene device, as will be explained more in detail with respect to FIG. 7. The rod-like spring elements 5100A and 5101A together form a spring unit 510A that provides a spring force against which the externally applied treatment force needs to act to pivot the motor carrier 140A around the pivot axis.

The here discussed rod-like spring elements 5100A and 5101A have certain characteristics that make them suitable for the intended use. On the one hand, a rod-like spring element can be made with high precision despite small manufacturing costs. Such a high manufacturing quality (i.e. low tolerances) supports that the spring elements can be mounted essentially without introducing a biasing force, which would need to be overcome by the applied treatment force, which is detrimental for the measurement quality of the minimal detectable threshold force value. On the other hand, a rod-like spring element can provide a relatively high spring constant while using only a limited construction volume. It is easier to accommodate a long object of a small diameter or small cross-sectional shape in the housing of a personal hygiene device than a coil spring or a leaf spring providing a similar spring constant at high precision. Further, as a rod-like spring element can be made with an essentially rectangular cross section, the spring constant in the pivot direction and the spring constant in the perpendicular direction can be precisely tuned. In some investigated embodiments, the rod-like spring elements 1500A and 1501A each have a free spring length of about 24 mm and a spring constant of about 2 N/mm and are made from a stainless spring steel 1.4310 and have a rectangular cross sectional shape with dimensions of 0.8 mm times 1.2 mm.

Figure 7:
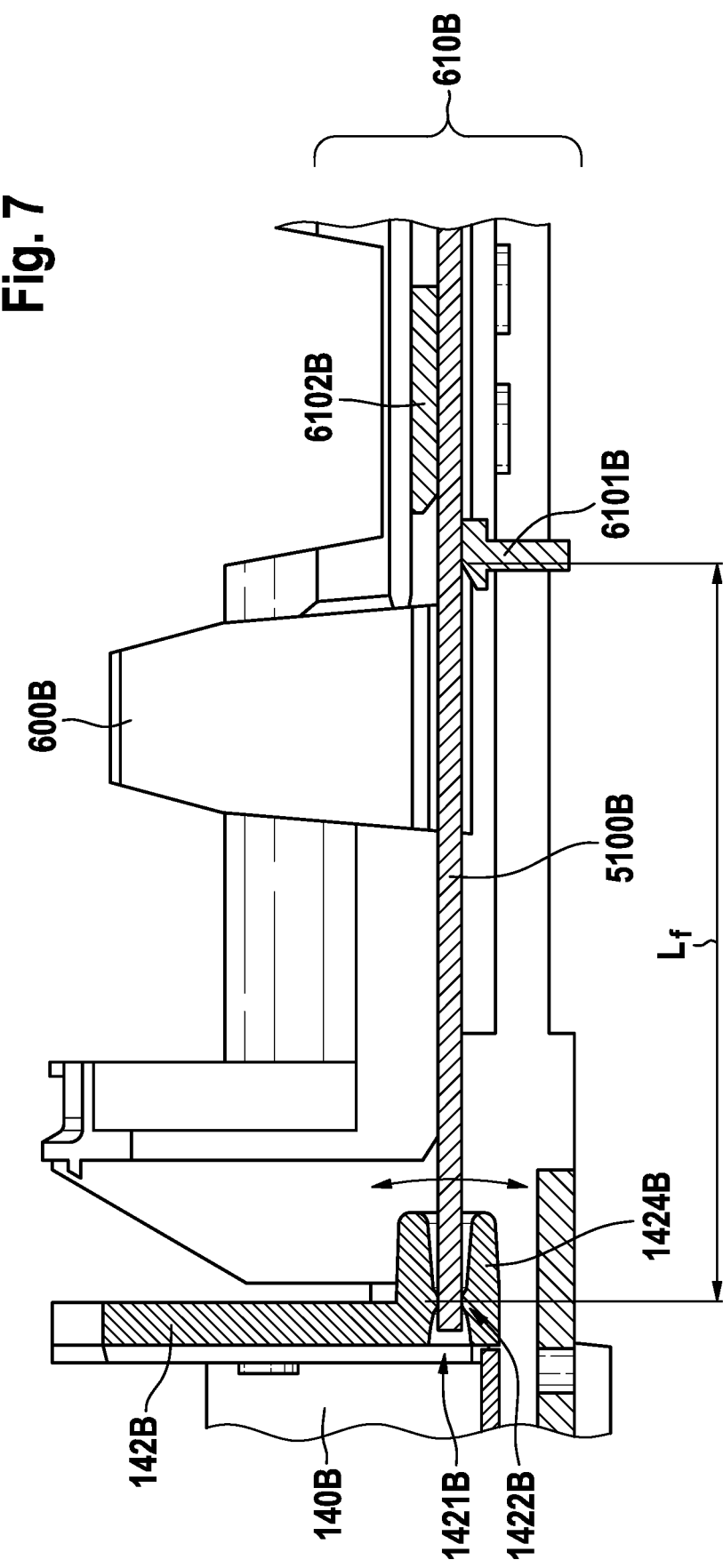
FIG. 7 is a cross-sectional cut of a detail of a motor carrier, spring unit, and chassis of an example personal hygiene device.
Figure 8:
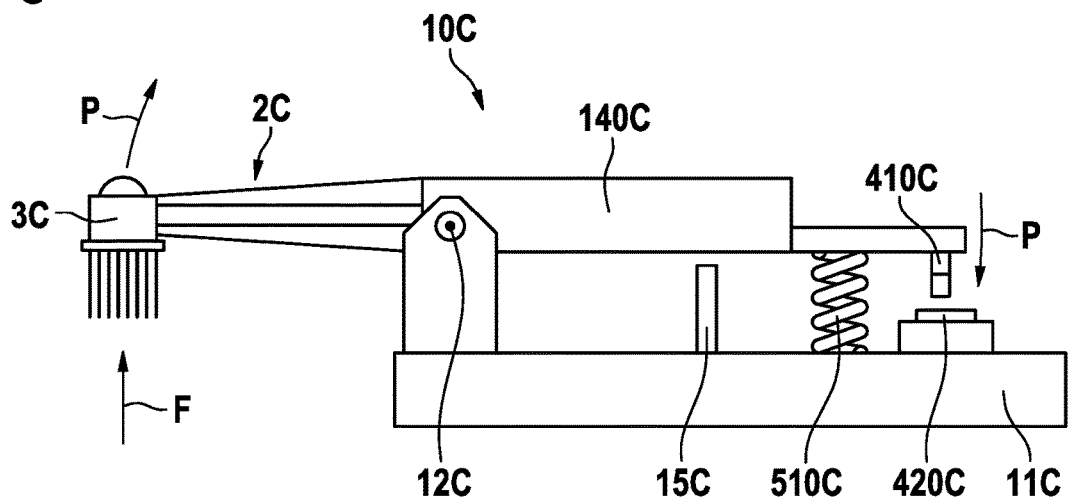
FIG. 8 is a schematic depiction of an example personal hygiene device in accordance with the present disclosure.

FIG. 7 shows a detail of a cut through the end of a motor carrier 140B at which a holder element 142B is fixedly mounted and through a chassis 600B that itself is fixedly mounted with respect to a handle of a personal hygiene device. The chassis 600B may in particular carry an energy source such as a rechargeable accumulator and a PCB on which the electronic parts of the personal hygiene device including the Hall sensor are mounted. The holder element 142B comprises a receptacle 1424B for receiving a rod-like spring element 5100B (another such receptacle may in particular be disposed on the opposite side of the holder element 142B as was shown in FIG. 6 to receive a parallel rod-like spring element). The receptacle 1424B has a through hole or bore 1421B in which aligned half-cylindrical bearing structures 1422B provide a bearing point for the rod-like spring element 5100B. As will be explained in more detail, the rod-like spring element 5100B is fixedly mounted at the chassis 600B and thus the bearing of the rod-like spring element 5100B at the holder element 142B must provide for a certain movability of the rod-like spring element 5100B within the receptacle 1424B. When the motor carrier 140B moves, e.g., about 1 mm around its pivot axis as is indicated by a double arrow in FIG. 7, the rod-like spring element 5100B should be able to pivot within its bearing in the receptacle 1424B and it should also be able to slightly move linearly with respect to the receptacle 1424B to compensate the movement of the motor carrier 140B relative to the chassis 600B. An alternate design to cope with the mentioned required flexibility is shown and discussed in connection with FIG. 9.

It is further shown in FIG. 7 that the rod-like spring element 5100B is received by a holding fixture 610B provided at the chassis 600B. The holding fixture 610B comprises a front clamp 6101B and a backside clamp 6102B. While it cannot be seen in the cut, the front clamp 6101B and the backside clamp 6102B have the form of U-shaped receptacles. In other embodiments, the clamps may be realized essentially as O-shaped clamps. The chassis may comprises more than the two shown clamps, in particular, the chassis may comprise three, four, five, six, seven, eight or even more clamps for fixedly holding the rod-like spring element 5100B. At least one of the clamps 6101B or 6102B, but in particular each of the clamps may have a chamfered front side (as is shown in FIG. 7) to ease the insertion of the rod-shaped spring element 5100B into the clamps.

The rod-like spring element 5100B has a free length Lf between the bearing point 1422B and the front clamp 6101B. The free length Lf of the rod-shaped spring element determines the spring constant that acts against a pivoting movement of the motor carrier 140B. E.g. the rod-shaped spring element 5100B may have a height of 0.8 mm and a width of 1.2 mm, a free length of 24.3 mm and it may be made from spring steel having an E-module of 195,000 N/mm2 Then a stiffness (i.e. spring constant) of about 2.09 N/mm results per rod-like spring element and in case two rod-like spring elements are used, a total stiffness of 4.18 N/mm results. By adapting the free length Lf, the stiffness of the spring unit can be tuned.

The general structure of a sensor permanent magnet and a Hall sensor that are mounted at a movable motor carrier and a handle of a personal hygiene device, respectively, is also applicable to a personal hygiene device having a generic type of motor instead of a resonant motor as was described. This is discussed with reference to FIG. 8, which is a schematic depiction of a personal hygiene device 10C having handle 1C and a head section 2C comprising a treatment head 3C. The head section 2C is fixedly connected with a motor carrier 140C that carries a motor for driving the treatment head 3C into motion. The motor carrier 140C is pivot mounted around a pivot axis 12C. In case an external treatment force F is applied at the treatment head in a treatment direction, the head section 2C and motor carrier 140C pivot around the pivot axis 12C as is indicated by arrows P in FIG. 8. The motor carrier 140C is mounted for a pivoting movement against a spring force applied by spring unit 510C. A sensor permanent magnet 410C is mounted at the motor carrier 140C and a Hall sensor 420C is mounted at the handle 11C. A stopper element 15C is provided to avoid further pivoting motion above a predetermined maximum applied external treatment force. Everything that was explained with respect to the sensor permanent magnet and Hall sensor in the previous discussion also applies for the embodiment of FIG. 8.

Figure 9:
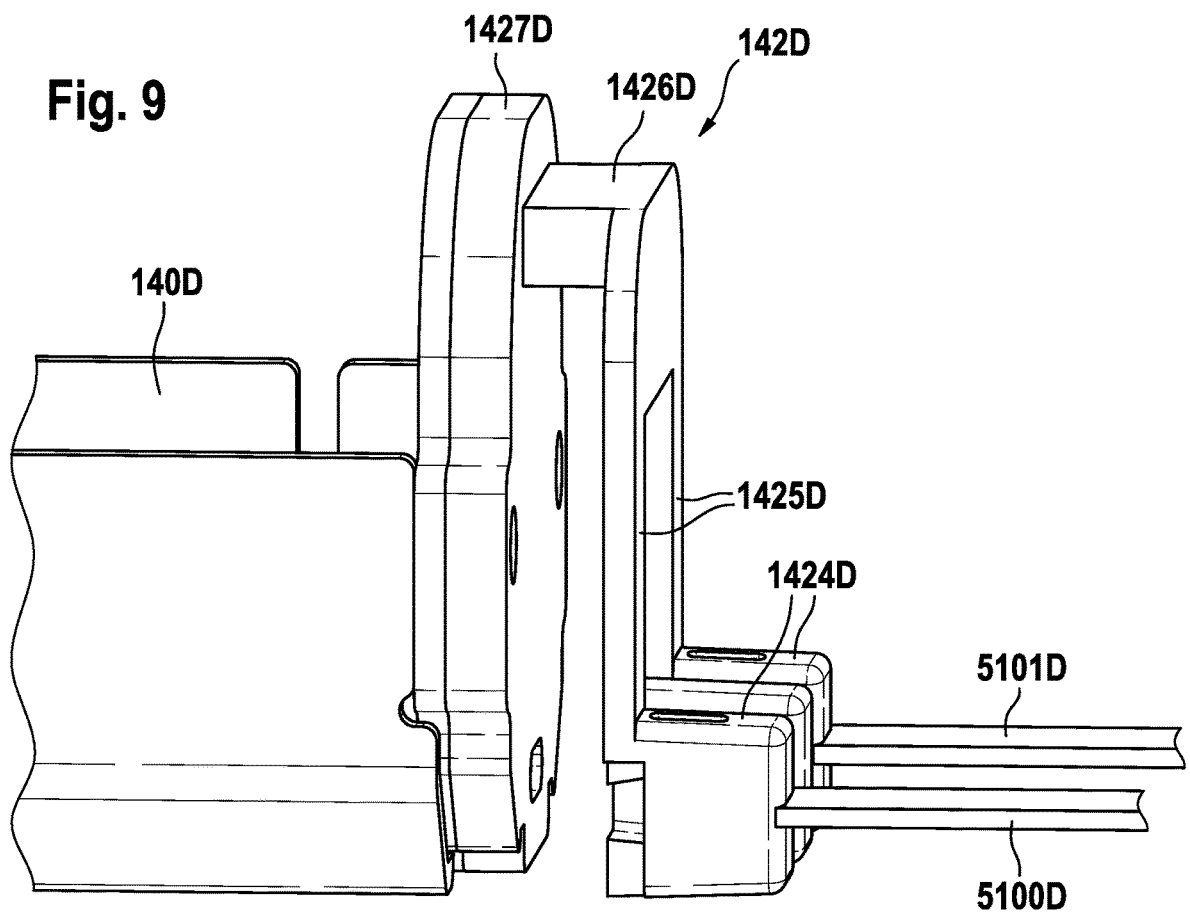
FIG. 9 is a depiction of a detail of a personal hygiene device, showing a portion of a motor carrier, a holding element, and a portion of a spring unit comprising two rod-like spring elements.

FIG. 9 is a depiction of a motor carrier 140D to which a holder element 142D is fixedly mounted and which holder element 142D holds two rod-like spring elements 5100D and 5101D in receptacles 1424D. In contrast to the bearing provided in the receptacle 1424B shown in FIG. 7 that allowed a pivoting and also slight linear motion of the rod-like spring element 5100B, FIG. 9 shows a realization where the rod-like spring elements 5100D and 5101D are fixedly secured at the receptacles 1424D. E.g. the rod-like spring elements 5100D and 5101D may have an undercut with respect to the longitudinal extension direction and the receptacles 1424D were injection molded around these undercuts so that the rod-shaped spring elements 5100D and 5101D are fixedly secured at the receptacles 1424D. The receptacles 1424D are connected via arms 1425D with a bridge structure 1426D extending from a base 1427D of the holding element 142D. This particular design allows the arms 1425D and bridge structure 1426D to flex when the motor carrier 140D pivots so that the length differences can be accommodated.

Figure 10A:
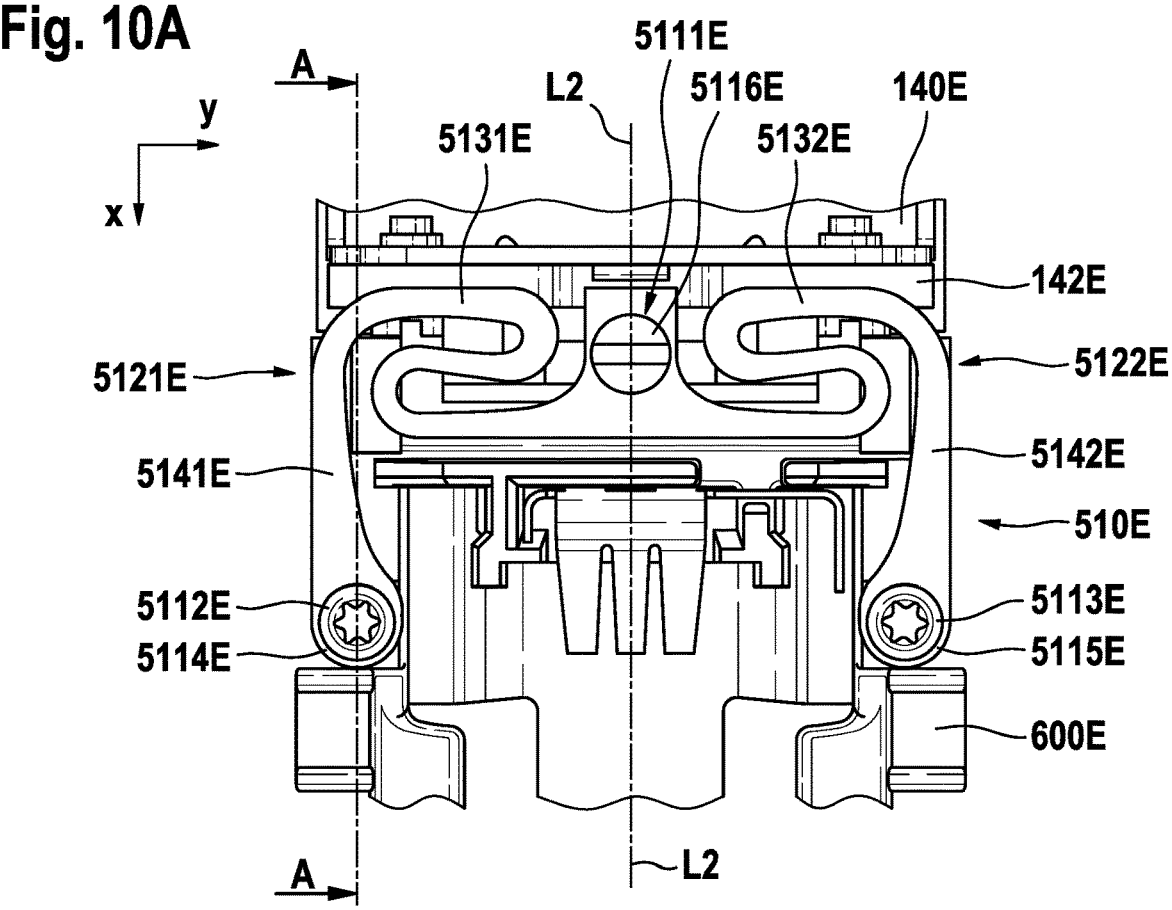
FIG. 10A is a top view onto another embodiment of an end portion of the motor carrier that is spring-connected with a chassis by means of a structured leaf spring.
Figure 10B:
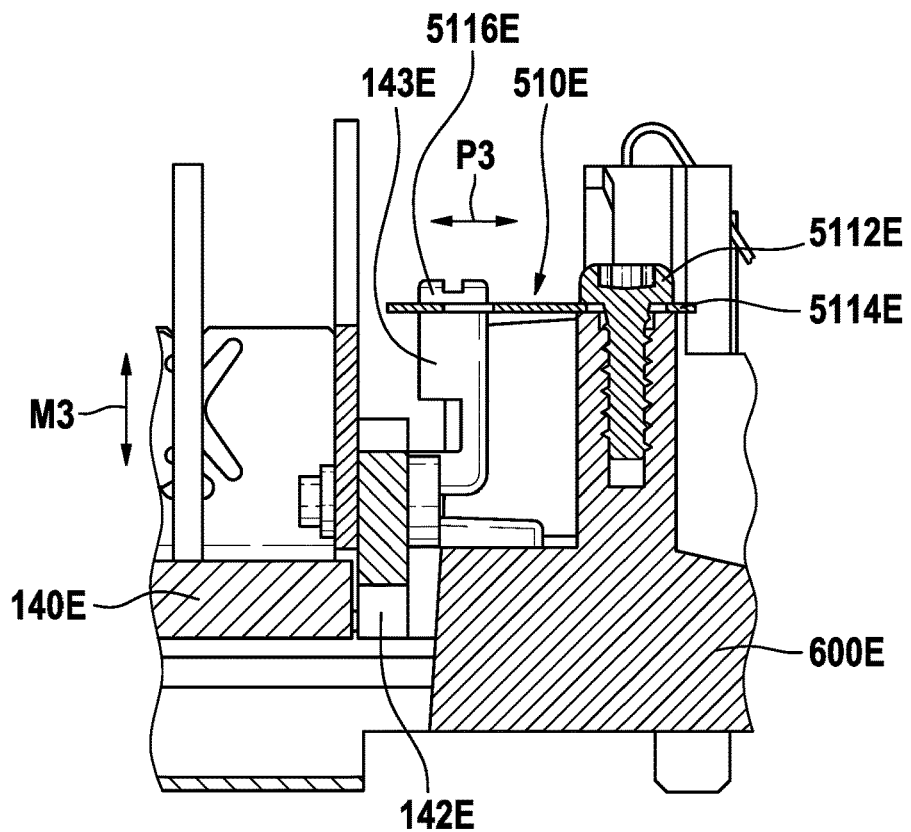
FIG. 10B is a side view of the embodiment shown in FIG. 10A.

FIGS. 10A and 10B show a top view and a cross sectional view along plane A-A indicated in FIG. 10A of another embodiment in accordance with the present disclosure, where an end portion of a support structure 140E is spring-connected to a chassis 600E via a structured leaf spring 510E, where the chassis 600E is fixedly secured at a handle housing and the motor carrier 140E is pivotably mounted at the handle housing as was explained in particular with reference to FIG. 2.

In the shown embodiment, the structured planar leaf spring 510E is symmetric with respect to the longitudinal center axis L2. The leaf spring 510E is fixedly secured at an arm portion 143E of the support structure 140E in a center position of a center portion 5111E by means of a screw 5116E. Instead of being fixed by means of a screw, other means of fixed connection may be chosen, e.g. the leaf spring may be in-molded into a portion of the motor carrier. Two arms 5121E and 5122E extend from the center portion 5111E. Arm 5122E has a first portion 51132E extending on the right-hand side (with respect to the paper plane) and having a generally S-shaped form and arm 5121E has a first portion 5131E extending on the left-hand side and having an identical but mirrored S-shape. Each S-shaped arm portion 5131E, 5132E continues mirror-symmetrically into a vertical arm portion 5141E and 5142E, respectively, that reminds the viewer of an elephant trunk. Each of the "trunk" portions widens towards a connector portion 5114E and 5115E, where each of the connector portions 5114E and 5115E is fixedly connected to a portion of the chassis 600E by means of a screw 5112E and 5113E, respectively.

The arm portion 143E of the support structure 140E serves to provide a length compensation when the support structure 140E pivots due to application of an external force in a direction M3 so that the arms pivots itself in a direction P3 to compensate for the length difference between the points of fixation of the leaf spring 510E at the chassis 600E and the support structure 140E.

The leaf spring 510E is one embodiment of a structured leaf spring that uses only a small construction volume and that can be designed by sheet thickness and exact shape of the arms to have a spring constant in treatment direction that is suitable for the intended use and where the spring constant in a lateral direction being perpendicular to the treatment direction is at least twice as high as the spring constant in treatment direction.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A personal hygiene device comprising
a handle intended for being grasped by a user;
a treatment head intended for being pressed against a body portion of a user;
wherein the treatment head is pivotably connected with the handle so that applying a treatment force against the treatment head at least along a treatment direction leads to a pivoting of the treatment head relative to the handle around a pivot axis;
a Hall sensor for measuring a measurement variable fixedly secured with respect to one of the handle and the treatment head;
a sensor cooperation unit for defining or influencing the measurement variable in dependence on the relative position of the sensor and the sensor cooperation unit, comprising a sensor permanent magnet, fixedly secured with respect to the other one of the handle and the treatment head; and
a spring unit for defining a rest position of the treatment head when no treatment force is applied at the treatment head, where the spring unit has a first spring constant in the treatment direction and a second spring constant in a lateral direction that is perpendicular to the treatment direction, which second spring constant is at least about two times higher than the first spring constant, wherein the first spring constant is in the range of between 2 N/mm to 6 N/mm and the second spring constant is in a range of between 6 N/mm to 24 N/mm.

2. The personal hygiene device in accordance with claim 1, wherein the spring unit comprises at least a first rod-like spring element that extends essentially along a longitudinal extension direction of the handle between a support structure disposed within the handle and the handle, which support structure is connected with the treatment head so that the support structure pivots around the pivot axis together with the treatment head, wherein the support structure is a motor carrier.

3. The personal hygiene device in accordance with claim 2, wherein the first rod-like spring element has a free length of at least about 15 mm.

4. The personal hygiene device in accordance with claim 2, wherein the spring unit comprises a second rod-like spring element that is arranged parallel to the first rod-like spring element.

5. The personal hygiene device in accordance with claim 2, wherein at least the first rod-like spring element has an essentially rectangular cross-sectional shape.

6. The personal hygiene device in accordance with claim 2, wherein the first rod-like spring element has a height in the range of between 0.6 mm to 1.0 mm and a width in the range of between 1.0 mm and 2.0 mm.

7. The personal hygiene device in accordance with claim 2, wherein an end of at least the first rod-like spring element is born in a receptacle such that the first rod-like spring element is pivot mounted and can move along its longitudinal extension direction.

8. The personal hygiene device in accordance with claim 2, wherein an end of at least the first rod-like spring element is fixedly born in a receptacle and the receptacle is spring-mounted at the support structure.

9. The personal hygiene device in accordance with claim 2, wherein an end of at least the first rod-like spring element is fixedly held in a holding fixture at the handle, wherein the holding fixture comprises at least one lower and at least one upper U-shaped clamp.

10. The personal hygiene device in accordance with claim 1, wherein the spring unit comprises at least one flat structured leaf spring that is mounted at the treatment head or at a support structure fixedly connected with the treatment head and at the handle, which structured leaf spring comprises two spring arms that each extend between a fixation point at the treatment head or at the support structure and a fixation at the handle, which spring arms each comprise an S-shaped arm portion and extend mirror symmetric to each other.

11. The personal hygiene device in accordance with claim 10, wherein each of the spring arms of the flat leaf spring has a longitudinally extending arm portion that extends between an end of the S-shaped arm portion and its fixation point at the handle.

12. The personal hygiene device in accordance with claim 10, wherein the flat structured leaf spring is mounted at least one of the treatment head or support structure and the handle by means of a friction bearing or via a resilient connector so that the friction bearing or the resilient connector provide for a compensation of a distance variation between the treatment head or the support structure and the handle in a longitudinal extension direction of the handle.

* * * * *